(12) United States Patent
Waszkowski et al.

(10) Patent No.: US 7,116,096 B2
(45) Date of Patent: Oct. 3, 2006

(54) VEHICLE DIRECTION DETECTION USING TONE RING

(75) Inventors: Paul J. Waszkowski, Medina, OH (US); David J. Taneyhill, Ladson, SC (US); Mark Bennett, Lorain, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 194 days.

(21) Appl. No.: 10/639,981

(22) Filed: Aug. 13, 2003

(65) Prior Publication Data

US 2005/0035758 A1 Feb. 17, 2005

(51) Int. Cl.
*G01P 3/66* (2006.01)
*G01P 3/481* (2006.01)
*B60Q 1/22* (2006.01)

(52) U.S. Cl. ..................... 324/178; 324/179
(58) Field of Classification Search ............... 324/163, 324/165, 173, 174, 178, 179, 180, 207.25, 324/207.24; 73/514.39; 180/170, 171; 384/448

See application file for complete search history.

(56) References Cited

U.S. PATENT DOCUMENTS

| | | | |
|---|---|---|---|
| 3,132,337 A * | 5/1964 | Martin ..................... 341/15 |
| 3,281,825 A * | 10/1966 | Sanders et al. ............... 341/15 |
| 3,930,201 A * | 12/1975 | Ackermann et al. ......... 307/106 |
| 4,072,893 A * | 2/1978 | Huwyler ................ 324/207.25 |
| 4,142,153 A * | 2/1979 | Smith ........................ 324/165 |
| 4,356,447 A * | 10/1982 | Honig et al. ................ 324/169 |
| 4,472,884 A | 9/1984 | Engebretson |
| 4,506,221 A | 3/1985 | Hayner |
| 4,774,494 A * | 9/1988 | Extance et al. ................ 341/6 |
| 4,953,305 A | 9/1990 | Van Lente et al. |
| 4,972,332 A * | 11/1990 | Luebbering et al. ........ 702/145 |
| 5,264,789 A * | 11/1993 | Braun et al. ................ 324/165 |
| 5,371,460 A * | 12/1994 | Coffman et al. ............ 324/165 |
| 5,497,084 A * | 3/1996 | Bicking ................. 324/207.25 |
| 5,497,748 A * | 3/1996 | Ott et al. .................. 123/406.6 |
| 5,511,319 A | 4/1996 | Geerlings et al. |
| 5,537,032 A | 7/1996 | Hurrell, II et al. |
| 5,664,335 A | 9/1997 | Suman et al. |
| 5,670,886 A * | 9/1997 | Wolff et al. ................. 324/644 |
| 5,737,226 A | 4/1998 | Olson et al. |
| 5,739,684 A | 4/1998 | Burns |
| 5,761,094 A | 6/1998 | Olson et al. |
| 5,878,370 A | 3/1999 | Olson |
| 5,977,764 A * | 11/1999 | Riedle et al. ................ 324/165 |
| 5,977,765 A * | 11/1999 | Gibson et al. .............. 324/165 |
| 6,034,525 A * | 3/2000 | Koerner et al. ............. 324/165 |
| 6,047,237 A | 4/2000 | Michmerhuizen |
| 6,191,576 B1 | 2/2001 | Ricks et al. |
| 6,192,315 B1 | 2/2001 | Geschke et al. |
| 6,208,131 B1* | 3/2001 | Cebis et al. ................ 324/165 |

(Continued)

*Primary Examiner*—Edward Lefkowitz
*Assistant Examiner*—Kenneth J. Whittington
(74) *Attorney, Agent, or Firm*—Calfee, Halter & Griswold LLP

(57) ABSTRACT

A tone ring preferably for use in a braking system of a vehicle has a first pattern of excitation indicative of speed of rotation of the tone ring, and a second pattern of excitation including frequency variations that is indicative of direction of rotation of the tone ring. The tone ring is rotated past a sensor, preferably a 2-wire passive sensor. A series of events are sensed during rotation of the tone ring past the sensor. The timing of occurrence of the events is detected and, on the basis of the timing detection, the direction of rotation of the tone ring is determined.

7 Claims, 3 Drawing Sheets

U.S. PATENT DOCUMENTS

| | | | |
|---|---|---|---|
| 6,282,954 B1 * | 9/2001 | Ott et al. | 73/488 |
| 6,286,222 B1 | 9/2001 | Voto et al. | |
| 6,301,794 B1 | 10/2001 | Parks et al. | |
| 6,326,778 B1 * | 12/2001 | Hummel | 324/173 |
| 6,401,047 B1 | 6/2002 | Voto et al. | |
| 6,404,188 B1 | 6/2002 | Ricks | |
| 6,459,261 B1 | 10/2002 | Luetzow et al. | |
| 6,498,474 B1 * | 12/2002 | Turner | 324/165 |
| 6,650,110 B1 * | 11/2003 | Schroeder et al. | 324/207.22 |
| 6,679,810 B1 * | 1/2004 | Boll et al. | 477/195 |
| 6,694,949 B1 * | 2/2004 | Ohira et al. | 123/406.58 |
| 6,815,944 B1 * | 11/2004 | Vig et al. | 324/179 |
| 2002/0003591 A1 | 1/2002 | Giannatto | |
| 2003/0050749 A1 * | 3/2003 | Cervantez et al. | 701/49 |
| 2004/0100251 A1 * | 5/2004 | Lohberg | 324/166 |

* cited by examiner

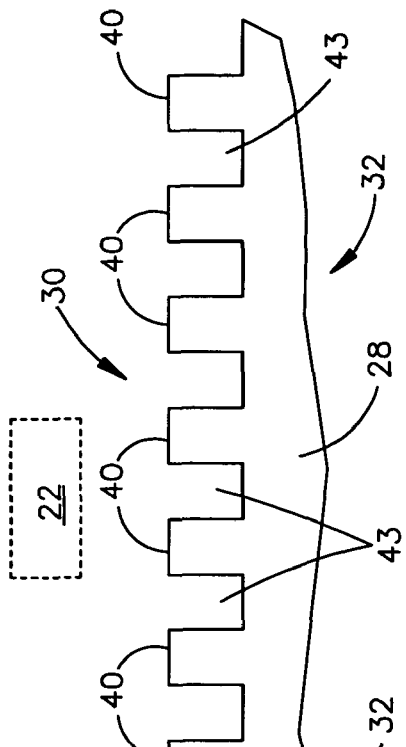
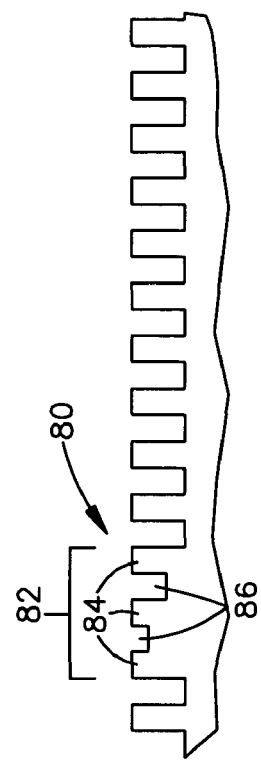
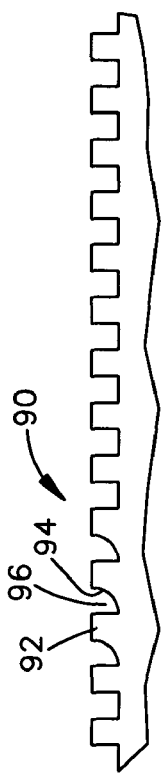
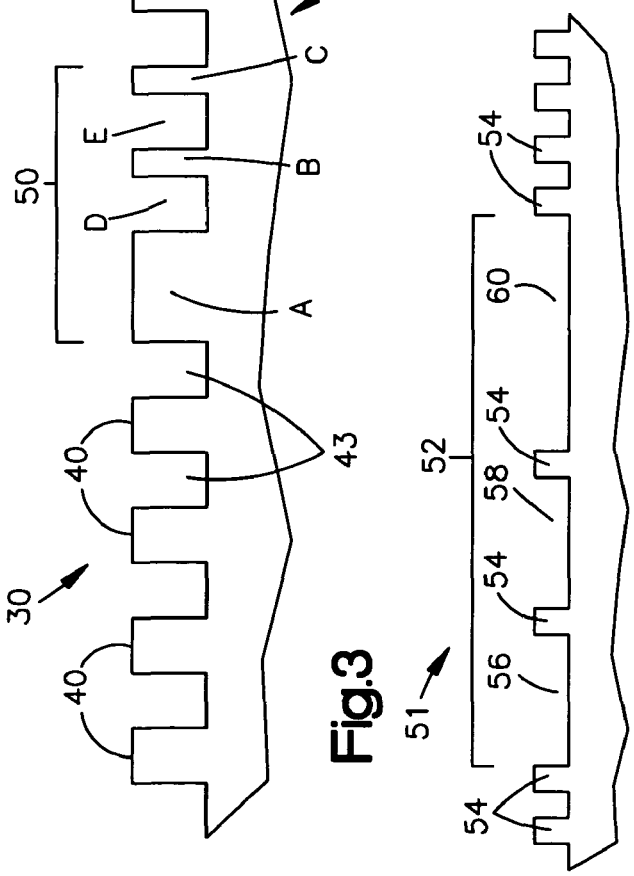
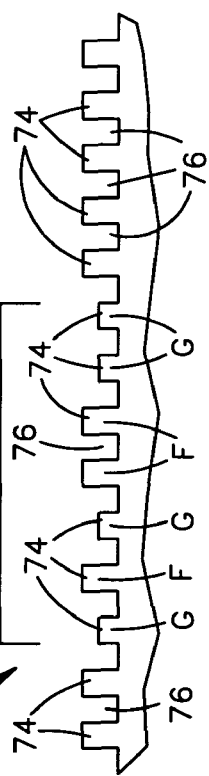

VEHICLE DIRECTION DETECTION USING TONE RING

FIELD OF THE INVENTION

This invention relates in general to determining the direction of travel of a vehicle. Such a determination can be used to activate a back-up alarm or other feature of the vehicle. More particularly, this invention relates to an anti-lock braking system that can also be used for helping to determine the forward or reverse direction of movement of a vehicle.

BACKGROUND OF THE INVENTION

Anti-lock braking systems, commonly referred to as ABS systems, are found increasingly in motor vehicles of all types including trucks. ABS systems function by monitoring the rotational speed of a wheel and using that information to adjust the braking force applied to the wheel to avoid lock-up of the wheel during braking. ABS systems typically employ a sensor mounted on a non-rotating portion of the axle, adjacent a rotating portion of the wheel assembly, to determine the wheel rotational speed.

In many ABS systems, the sensor used is a magnetic pick-up. The sensor produces a voltage signal when excited by a ferrous tone ring or exciter ring which is mounted on a rotating portion of the wheel assembly. The tone ring includes a series of teeth which project from a surface of the tone ring. The sensor is mounted adjacent the tone ring, and each time a tooth of the tone ring rotates past the magnetic pick-up an electrical pulse is generated. The electrical pulse is sent to a logic portion or computer associated with the ABS system. The computer associated with the ABS system evaluates the pulses to determine, among other things, the speed and acceleration of the rotating wheel and whether wheel lock-up is impending. In response to this determination, the ABS system modulates the braking forces to prevent wheel lock-up from occurring.

It is desirable to be able to determine when a vehicle is backing up, so as to activate a back-up alarm or other feature of the vehicle. This can be especially desirable in a tractor-trailer combination because the overall length of the combination places the operator of the vehicle from being close to and seeing around the rear portion of the vehicle. In a typical commercial tractor-trailer combination, there is no wiring dedicated between the tractor and the trailer for carrying a signal for use in activating a back-up alarm of the vehicle. Adding a dedicated wire for this purpose would be difficult commercially. Therefore, it would be desirable for any such system not to require dedicated wiring between the tractor and the trailer.

SUMMARY OF THE INVENTION

In one embodiment, the invention relates to a method comprising the steps of rotating a tone ring past a sensor; sensing a series of events that occur during rotation of the tone ring past the sensor; detecting the timing of occurrence of a series of events during rotation of the tone ring past the sensor; and determining, on the basis of the timing detection, the direction of rotation of the tone ring. The sensing step is preferably performed with a 2-wire passive sensor commonly known as a magnetic pickup.

The invention also relates to a method for detecting direction of wheel rotation, comprising the steps of producing a first detectable frequency pattern in response to wheel rotation in a first direction; producing a second detectable frequency pattern in response to wheel rotation in a second direction that is opposite the first direction; and detecting at least one of the first and second patterns to determine direction of wheel rotation.

The invention in another embodiment relates to apparatus comprising a tone ring rotatable in response to forward or reverse movement of a vehicle, the tone ring having a pattern of excitation including frequency variations that is indicative of direction of rotation of the tone ring. The apparatus also includes a sensor having an output responsive to rotation of the tone ring past the sensor. The sensor has a first output responsive to rotation of the tone ring in a first direction, and a second output responsive to rotation of the tone ring in a second direction opposite the first direction, the second output being different from the first output.

The invention in another embodiment also relates to a tone ring for use in a braking system of a vehicle, the tone ring having a first pattern of excitation indicative of speed of rotation of the tone ring, the tone ring having a second pattern of excitation including frequency variations that is indicative of direction of rotation of the tone ring.

BRIEF DESCRIPTION OF THE DRAWINGS

FIG. 3 is a schematic view of a portion of the tone ring of FIG. 2, taken generally along line 3—3 of FIG. 2; and FIGS. 4–12 are a series of schematic views similar to FIG. 3 of portions of tone rings in accordance with alternative embodiments of the invention.

DETAILED DESCRIPTION OF THE INVENTION

Figure 1:
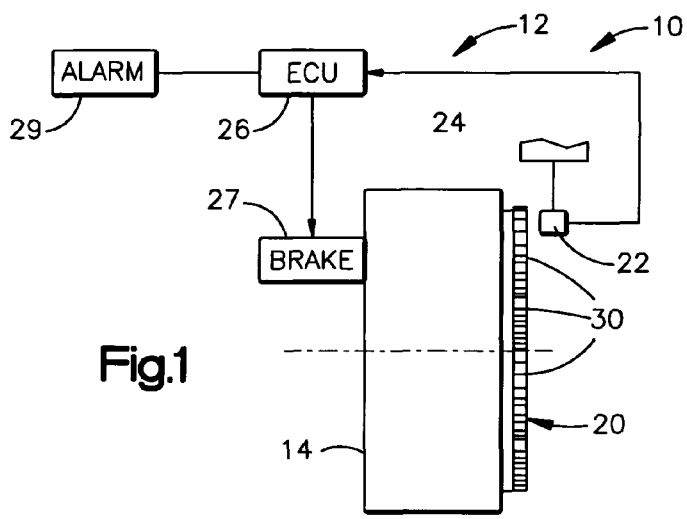
FIG. 1 is a schematic diagram of a vehicle including a direction sensing system in accordance with a first embodiment of the present invention.

This invention relates in general to determining the direction of travel of a wheeled vehicle. Such a determination can be used to activate a back-up alarm or other feature of the vehicle. More particularly, this invention relates to an anti-lock braking system that can also be used to help determine the forward or reverse direction of a movement of a vehicle. The invention is applicable to different constructions and types of direction sensing systems and ABS systems. As representative of the present invention, FIG. 1 illustrates schematically a direction sensing system 10. The direction indicating system 10 is part of an antilock making system (ABS system), although the invention is not limited to antilock braking systems or even to braking systems per se.

The system 10 is shown as incorporated on a vehicle 12 in association with a rotatable ground wheel 14 of the vehicle. The system 10 includes a tone ring 20 constructed in accordance with a first embodiment of the invention. The tone ring 20 is fixed for rotation with the wheel 14. A sensor 22 is mounted on a non-rotating portion 24 of the vehicle 12 adjacent the tone ring 20. Rotation of the tone ring 20 past the sensor 22 generates an electrical signal from the sensor that is indicative of the speed of rotation of the wheel 14. This electrical signal is coupled to an electronic control unit or ECU 26. The ECU 26, in response to the signal, controls a brake 27 associated with the wheel 14.

The sensor 22 may be a magnetic sensor of the type known in the art that is operable to output an analog signal as a function of the magnetic flux density of any magnetic flux passing through one or more magnetic flux sensitive transducers of the magnetic sensor. The sensor 22 is a standard, inexpensive, passive magnetic pickup sensor that uses two wires. This is a current production wheel speed sensor. The present invention does not require the use of multiple pickup sensors, or expensive active sensing technology that typically requires three wires or four wires. (A passive sensor requires no source of electrical power.)

Thus, the sensor 22 may be a magneto-resistor, a Hall effect element, a coil, etc. The sensor 22 is spatially positioned from the tone ring 20 across an air gap so that a portion of a magnetic field of the tone ring 20 traverses the air gap and the magnetic flux sensitive transducers are disposed within the magnetic field. As a result, the magnitude of the analog signal output by the sensor 22 varies in response to movement of the tone ring 20 that increases or decreases the reluctance across the air gap thereby to alter the magnetic flux density of the magnetic flux passing through the magnetic flux sensitive transducers.

The tone ring 20 is made at least partially from a magnetic material so that as it moves relative to the sensor 22, the magnetic flux density at the sensor is varied.

The tone ring 20 has an annular configuration including a main body portion 28 on which are formed a plurality of teeth, designated as a group 30. The teeth 30 are separated from each other by air spaces, designated as a group 32. Rotation of the teeth 30 and the spaces 32 past the sensor 22 varies the magnetic flux at the sensor. The sensor 22, in response, provides the electrical signal used by the ABS system 10 to control braking of the wheel 14 with which the tone ring 20 is associated.

When the rotation of the tone ring 20 causes any group of adjacent teeth 30 (a "segment") to move past the sensor 22, the magnetic flux density at the sensor is modified. The modification of the magnetic flux density is based on the pattern of physical characteristics of the teeth 30 in the segment and of the spaces 32 between the teeth. This physical pattern provides the segment with a pattern of excitation—that is, a magnetic configuration that provides a particular modification of magnetic flux density as the segment rotates past the sensor 22.

For example, the pattern of excitation of a tone ring segment depends on the width (circumferential extent) of each individual tooth 30. The pattern of excitation also depends on the width (circumferential extent) of each one of the spaces 32 between the teeth 30 in the segment. The pattern of excitation also depends on the magnitude of the air gap between the teeth 30 and the sensor 22.

The tone ring segment, that is, the group of teeth 30, thus has a physical pattern of tooth width and of space width and of air gap. When the rotation of the tone ring 20 causes the teeth 30 in the segment to move past the sensor 22, the magnetic flux density at the sensor is modified in a manner consistent with the physical pattern of the teeth. The output of the sensor 22 varies in response to the pattern of excitation of the tone ring segment that is moving past the sensor.

The ECU 26 can be programmed to recognize various different patterns of excitation that result in various different sensor outputs. In particular, the ECU 26 can be programmed to recognize the rate at which a segment of teeth having a uniform width and uniform spaces is rotating past the sensor 22. With the ECU 26 this rate of rotation of the tone ring 20 produces a signal that is indicative of the rate of rotation of the vehicle wheel 14 with which the tone ring is associated. This rate of rotation of the vehicle wheel 14 is indicative of the speed of the vehicle 12 across a ground surface, such as a roadway.

The group of teeth 30 of the tone ring 20 includes a number of teeth 40 that are designated herein as "standard" teeth. The standard teeth 40 are used in the known ABS speed sensing function. The standard teeth 40 are all identical to each other. The standard teeth 40 are arranged in segments 42 (FIG. 2) on the tone ring 20. Within each segment 42, the standard teeth 40 are spaced apart from each other by spaces 43. All the spaces 43 between the standard teeth 40 are identical to each other.

When the rotation of the tone ring 20 causes any one of the segments 42 of standard teeth 40 to move past the sensor 22, the magnetic flux density at the sensor is modified in a particular manner that is recognized by the ECU 26. That manner of modification is the same regardless of which segment 42 of standard teeth 40 moves past the sensor 22. That manner of modification is also the same regardless of whether the segment 42 moves past the sensor 22 in one direction or in the opposite direction (that is, regardless of the direction of rotation of the tone ring 20).

As a result, the modification of the magnetic flux density that occurs when a segment 42 moves past the sensor 22 is a recognizable modification that always is the same regardless of direction of movement of the vehicle 12. The sensor 22 in response outputs a particular signal whose characteristics vary depending only upon the rate of modification, that is, the rate of movement of the segment 42 past the sensor. This signal thus is taken as representative of the speed of movement of the vehicle 12 across a ground surface.

The group of teeth 30 of the tone ring 20 includes a number of segments that are different from the segments 42 of "standard" teeth 40. These segments, each designated with the reference numeral 50 (FIGS. 2 and 3), are direction indicating segments.

As described below, each direction indicating segment 50 has a pattern of excitation that is different depending on whether the segment moves past the sensor 22 in one direction or in the opposite direction. That is, as the teeth of the direction indicating segment 50 move past the sensor 22 in one direction, the sensor has a first output. As the teeth of the direction indicating segment 50 move past the sensor 22 in a second direction opposite the first direction, the sensor has a second output that is different from the first output. The different outputs can be read by the ECU 26 as being indicative of different directions of rotation of the tone ring 20 and thus as being indicative of different directions of movement of the vehicle 12 along the ground surface.

Figure 2:
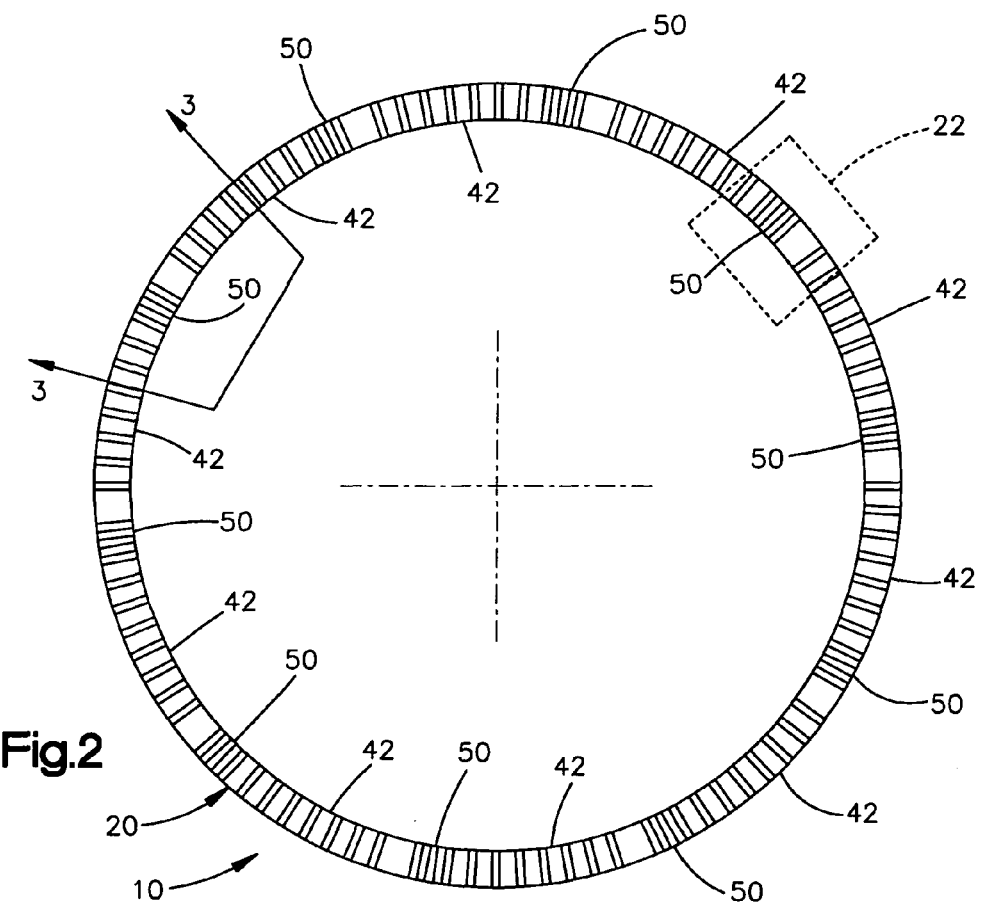
FIG. 2 is a view of a tone ring that forms a part of the system of FIG. 1.

The specific tone ring 20 that is illustrated in FIGS. 2 and 3 has direction indicating segments 50 of a first type. FIGS. 4–12, described below, illustrate tone rings in accordance with further embodiments of the invention, that is, tone rings having direction indicating segments of additional, different, types.

The segment 50 of the tone ring 20 (FIGS. 2–3) includes a single tooth A that is wider (has a greater circumferential extent, from left to right as seen in FIG. 3) than the standard teeth 32. The segment 50 also includes two teeth B and C that are narrower (having a lesser circumferential extent) than the standard teeth. The segment includes a space D between the teeth A and B, and a space E between the teeth B and C. The spaces D and E in the illustrated embodiment are the same width as each other and, although not shown, may be much narrower than the other spaces.

As a result, the distance between the leading edges of the teeth A, B, and the adjacent standard teeth 40 varies, that is, is not uniform, whether the tone ring is rotating in one direction or in the opposite direction; there is a series of distances between the teeth, that varies in a predetermined pattern. Thus, the time periods between adjacent leading edges of the teeth passing the sensor when the tone ring rotates, vary in a predetermined pattern. The sensor senses when a leading edge of a tooth passes the sensor—an "event". Because the teeth in the direction indicating segment 50 are not uniformly spaced, the frequency of these events changes in a known, predetermined manner.

When the wider tooth A then the narrow teeth B and C pass the sensor, the sensor 22 produces a different output than the output that is produced when two standard teeth 40 pass the sensor. When the narrower teeth B and C and then the wider tooth A pass the sensor 22, the sensor also produces a different output than the output that is produced when two standard teeth 40 pass the sensor. Therefore, the segment 50 including three teeth and two spaces has a pattern of excitation that is different from the pattern of excitation of a group of three standard teeth 40 and two standard spaces 43.

The teeth A, B and C are arranged on the tone ring in a physical pattern that reads A-B-C in one direction and C-B-A in the opposite direction. Therefore, the pattern of excitation of the segment 50 differs, depending on which direction the segment is moving when it passes the sensor 22. That is, the pattern of time periods between adjacent leading edges of the teeth in the segment 50 is different when the tone ring rotates in one direction than it is when the tone ring rotates in the opposite direction.

Specifically, if the segment 50 moves past the sensor 22 in a direction from left to right as viewed in FIG. 3, the two narrower teeth B and C pass the sensor first, followed by the wider tooth A. This provides a first series of time periods, or intervals, between the sequential leading edges of the teeth in the segment 50. This provides a first pattern of excitation for the sensor 22, and the sensor produces a first output.

On the other hand, if the segment 50 moves past the sensor 22 in a direction from right to left as viewed in FIG. 3, the wider tooth A passes the sensor first, followed by the two narrower teeth B and C. This provides a second series of time periods, or intervals, between the sequential leading edges of the teeth in the segment 50. This provides a second pattern of excitation for the sensor 22, different from the first pattern of excitation. In response, the sensor 22 produces a second output, different from the first output.

The ECU 26 is programmed to read and respond to these two different outputs that arise from the two different patterns of excitation. If the sensor 22 generates the first output, the ECU 26 determines that the tone ring 20 is rotating in a first direction of rotation. The first direction of rotation corresponds to a first direction of movement of the vehicle 12 along the ground surface, for example, a forward direction of travel. If the sensor 22 generates the second output, the ECU 26 determines that the tone ring 20 is rotating in a second direction of rotation, opposite the first direction of rotation. The second direction of rotation corresponds to a second direction of movement of the vehicle 12 along the ground surface, opposite the first direction, for example, a reverse direction of travel.

Thus, the ECU 26 can determine, from the direction of rotation of the tone ring 20, the forward or reverse direction of travel of the vehicle 12. If the ECU 26 determines that the vehicle 12 is traveling in reverse, the ECU can cause a back-up alarm or other feature, shown schematically at 29 (FIG. 1) to be actuated.

Testing of an experimental tone ring 20 having the direction indicating segment 50 shown in FIG. 3 showed its pattern to be rapidly distinguishable (recognizable) within a broad spectrum of sensor adjustment (gaps between sensor 22 and tone ring 20), while still being simple enough to be easily distinguished from the more critical function of calculating wheel speeds for the ABS system 10.

Other segments and other patterns of excitation are usable. Some of those are discussed below in detail with reference to FIGS. 4–12. Generally, such embodiments fall into two classes: frequency-based embodiments, and amplitude-based embodiments.

A frequency-based embodiment is one in which tooth width and tooth spacing is varied from the standard tooth width and tooth spacing thereby to vary signal periodicity. That is, the time periods or intervals between succeeding events (passing of a leading edge of a tooth past the sensor) varies; the frequency of these events changes. The tone ring 20 of FIGS. 1–3 is an example.

An amplitude-based embodiment is one in which the height (radial extent) of the tooth is varied so that the air gap between the tooth and the sensor 22 varies thereby to vary signal strength. The tone ring 70 of FIG. 5 (discussed below) is an example.

The frequency-based embodiment may be preferable to amplitude-based because it is not sensitive to sensor air gap. Signal amplitude is a function of sensor air gap, and sensor air gap is affected by installation accuracy, service/repair accuracy, wheel bearing slop (radial runout of axle wheel bearing assemblies), etc. Also, signal amplitude/air gap are used for sensor diagnostics. Amplitude-based reverse detection and sensor diagnostics might interfere with each other.

Because frequency-based patterns should repeat with perfect periodicity when the vehicle 12 is not changing direction, and because the ECU 26 can have knowledge of what this pattern and periodicity is (i.e., it knows the answer ahead of time and can use it for comparison), the system 10 can be designed such that direction sensing (reverse detection) does not interfere with the normal ABS wheel speed calculation, nor with the gap-based sensor diagnostics.

The system 10 may require a one-time initialization sequence. This may be as simple as turning on the ignition and spinning each tire in a forward direction of rotation, one at a time. This needs to be done only during initial vehicle assembly, or during service.

Because the ECU 26 can recognize the pattern of excitation of the tone ring segment 50 in either direction, the same tone ring 20 can be used for all sensed wheels 14; different rings for curbside wheels and for roadside wheels are not needed.

Because the direction indicating segments 50 take up only a small portion of the circumference of the tone ring 20, the ECU 26 is still able to recognize the standard teeth 40 and thus the ABS sensing function is still operative.

A tone ring, like the tone ring 20, having the direction sensing pattern of excitation, may possibly be needed on only one wheel on the vehicle 12. Some ABS systems sense wheel speed at only two wheels. In this case, the two sensed wheels might retain their normal tone rings, and a third tone ring/speed sensor set for direction sensing could be placed on one of the wheels that is not already sensed for speed sensing. Alternatively, one of the two tone rings of the two sensed wheels may be replaced with a direction-indicating ring like the ring 20. Thus, additional manufacturing flexibility is provided, as the direction sensing wheel doesn't necessarily need to be used also for speed sensing.

The direction indicating segment could be placed once per revolution on the tone ring 20. Alternatively, for faster sensing, the direction indicating segment could be placed more than once per revolution on the tone ring 20, for example, four times. In the illustrated embodiment, the tone ring 20 has ten direction indicating segments 50, equally spaced along the tone ring. This number of direction indicating segments has proven, during testing, to (a) appear frequently enough during wheel rotation to obtain rapid determination of direction, while (b) not interfering with the speed sensing determination that is provided by the standard teeth 40.

Because the direction sensing determination is based on wheel rotation, the vehicle transmission need not be placed in reverse to activate the direction sensing mechanism. Therefore, if a vehicle 12 is at a stop light with the transmission in neutral, and the brake pedal is released, a reverse indication is still provided if the vehicle rolls backwards.

The direction sensing function of the present invention is accomplished with standard, inexpensive, 2-wire passive magnetic pickup sensors. This is because the same current production wheel speed sensor 22 is used, and the output signal is of the same type. There is no need for more expensive active sensing technology.

FIG. 4 shows another tone ring 51 that is a frequency-based embodiment of the present invention. The tone ring 51 has a direction indicating segment 52 that includes a number of standard teeth 54 and also three relatively long spaces 56, 58 and 60 where standard teeth are removed (not present). The three spaces 56–60 are of different lengths. The two spaces 56 and 58 are the same length as each other, and the remaining space 60 is wider than the first two spaces. As a result, the direction indicating segment 52 has two different patterns of excitation, and reads (appears) differently when moved past the sensor 22 (not shown in FIG. 4) in one direction, than it does when moved past the sensor in the opposite direction. The frequency with which the teeth pass the sensor varies in a known, predetermined pattern. For this reason, the ECU when appropriately programmed can determine in which direction the tone ring 51 is moving and, thereby, the vehicle direction (forward or reverse).

Many other frequency-based embodiments (not shown) are possible, which would include varying tooth width and spacing. Such embodiments are included within the scope of the present invention.

An amplitude-based embodiment of the invention is shown in FIG. 5. In this embodiment, a tone ring 70 includes a direction indicating segment 72. In the direction indicating segment 72, all the teeth 74 are of the same width, and are equally spaced along the tone ring with equal spaces 76 between them.

The segment 72 includes some teeth 74 marked "F" all having an identical first configuration, the same as the standard teeth. The segment 32 also includes several teeth 74 marked "G" that have a second configuration different from the first configuration of the teeth "F". Specifically, the teeth G are shorter (in radial extent) than the teeth F, and the air gap between the teeth G and the sensor 22 (not shown in FIG. 5) is greater than the air gap between the teeth F and the sensor. The teeth "G" therefore produce a different output in the sensor 22 than do the teeth "F", that is, an output signal having a different amplitude.

The teeth 74 in the direction indicating segment 72 are arranged in a pattern that is different depending on the direction of rotation of the tone ring 70. The pattern in the segment 72 is GFGFFGG when viewed (or read) from left to right in FIG. 5. The pattern in the segment 72 is GGFF-GFG when viewed (or read) from right to left in FIG. 5. As a result, the segment 72 has two different patterns of excitation, and reads (appears) differently when moved past the sensor 22 in one direction, than it does when moved past the sensor in the opposite direction. For this reason, the ECU when appropriately programmed can determine in which direction the tone ring 70 is moving and, thereby, the vehicle direction (forward or reverse).

Many other amplitude-based embodiments are possible, which would include varying tooth heights. A few are illustrated in FIGS. 6–11, and others, not shown, are included within the scope of the present invention.

Specifically, FIG. 6 illustrates a portion of a tone ring 80 including a direction indicating segment 82. The segment includes three adjacent teeth 84 that have between them spaces 86 of different depths (alternatively, it can be said that the three teeth are of different heights). The three teeth 84 and the spaces 86 are arranged serially in a pattern that is different when read in different directions.

FIG. 7 shows a segment of a tone ring 90 in which the teeth 92 have concave edges 94 on one side leading down to the spaces 96 between the teeth. As a result, the tooth height varies, thus providing an amplitude variation in the sensor output.

Figure 8:
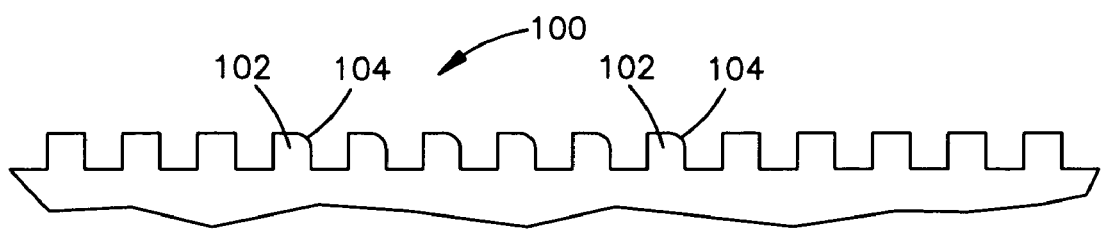

FIG. 8 shows a segment of a tone ring 100 in which the teeth 102 have convex edges 104 on one corner. As a result, the tooth height varies, thus providing an amplitude variation in the sensor output.

Figure 9:
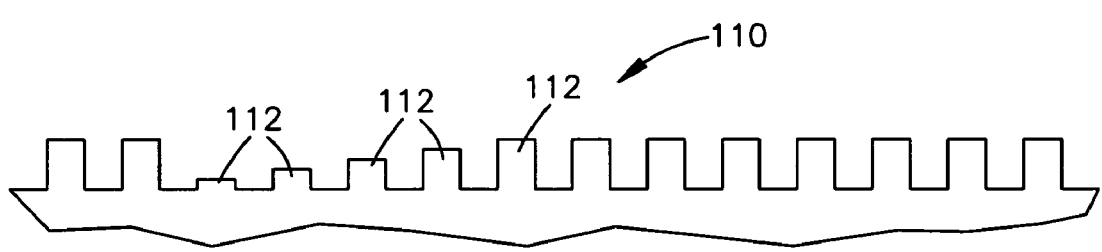
Figure 10:
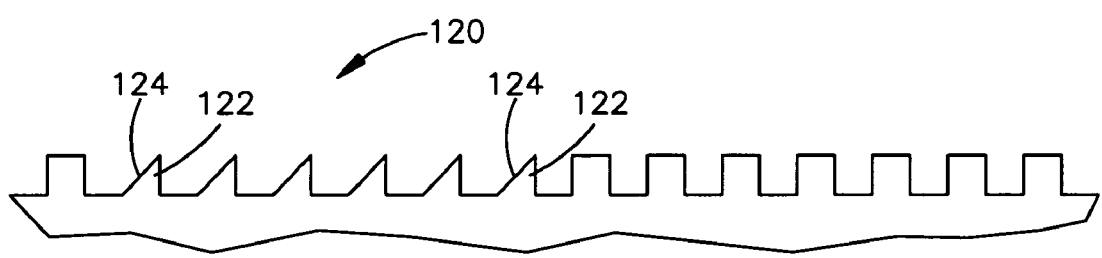

FIG. 9 shows a segment of a tone ring 110 in which a plurality of adjacent teeth 112 have varying heights. In this example, for instance, the teeth 122 repeat and restart every five teeth or so, over and over again. FIG. 10 shows a segment of a tone ring 120 in which all the teeth 122 have sloped leading edges 124.

Figure 11:
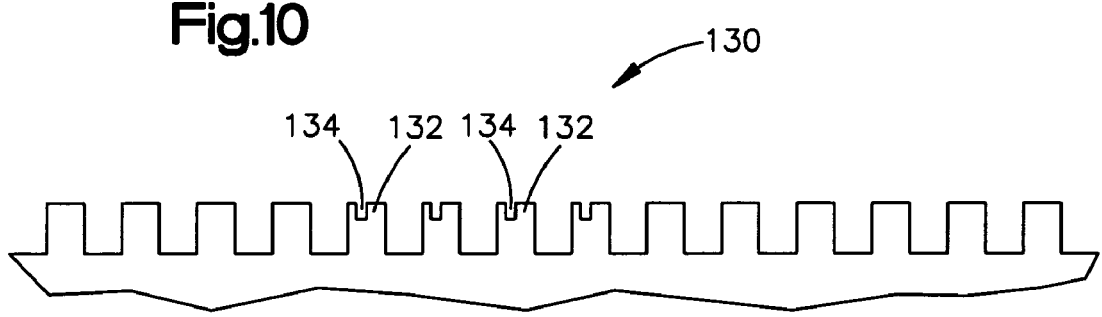
Figure 12:
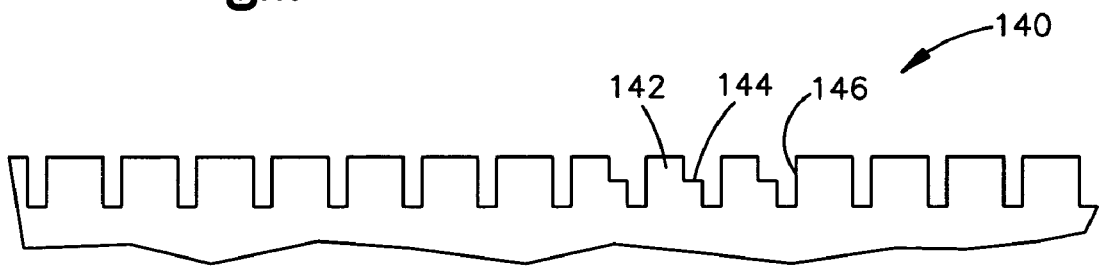

FIGS. 11 and 12 illustrate tone rings in which the direction indicating segment is both frequency-based and amplitude-based. Specifically, the tone ring 130 (FIG. 11) includes a direction indicating segment in which the teeth 132 have indentations 134 near one edge but away from the other edge. FIG. 12 shows a direction indicating segment of a tone ring 140 in which the teeth 142 have notched leading edges 144 and plain trailing edges 146. In addition to the amplitude variations, the steps and interruptions will cause frequency changes, as well.

Unless otherwise specified, use of the term "or" herein is the inclusive, and not the exclusive, use. See BRYAN A. GARNER, A DICTIONARY OF MODERN LEGAL USAGE 624 (2d Ed. 1995).

From the above description of the invention, those skilled in the art will perceive improvements, changes, and modifications in the invention. Such improvements, changes, and modifications within the skill of the art are intended to be included within the scope of the appended claims.

Having described the invention, we claim:

1. Apparatus comprising:
  a tone ring rotatable in response to forward or reverse movement of a vehicle, said tone ring having a pattern of excitation including amplitude variations that is indicative of the direction of rotation of said tone ring; and
  a sensor having an output responsive to rotation of said tone ring past said sensor, said sensor having a first output responsive to the amplitude variations produced by rotation of said tone ring in a first direction, said sensor having a second output responsive to the amplitude variations produced by rotation of said tone ring in a second direction, said second output being different from said first output;
  said first and second outputs for use in activating a vehicle function that is indicative of a reverse direction of movement of the vehicle;

wherein the tone ring includes a plurality of teeth that are of the same width and are equally spaced along the tone ring with equal spaces between them, a first plurality of the teeth being shorter than a second plurality of the teeth thereby producing an output of different amplitudes in the sensor.

2. Apparatus as set forth in claim 1 further including a vehicle back-up alarm that is electrically connected with said sensor and that is activated in response to determination of a reverse direction of movement of the vehicle based on said first and second outputs.

3. Apparatus as set forth in claim 1 wherein said tone ring is part of a vehicle antilock braking system and is usable in said system in sensing speed of rotation of an associated vehicle wheel.

4. Apparatus as set forth in claim 1 wherein said sensor is a 2-wire magnetic pickup sensor.

5. A method comprising the steps of:
rotating a tone ring of a vehicle past a sensor;
sensing a series of events that occur during rotation of the tone ring past the sensor and generating a series of signals of varying amplitude in response to the events;
detecting the amplitude of the signals; and
determining, on the basis of the amplitude detection, the direction of rotation of the tone ring;
wherein the step of rotating a tone ring includes rotating a tone ring that includes a plurality of teeth having a radial extent that varies so that the air gap between the teeth and the sensor varies thereby to vary signal amplitude during rotation of the tone ring; and
wherein the step of rotating a tone ring includes rotating a tone ring that includes a plurality of teeth that are of the same width and are equally spaced along the tone ring with equal spaces between them, a first plurality of the teeth being shorter than a second plurality of the teeth thereby producing an output of varying amplitude in the sensor.

6. A method as set forth in claim 5 further including the step of activating a vehicle back-up alarm in response to determination of a direction of rotation of the tone ring.

7. A method as set forth in claim 5 wherein said tone ring is part of a vehicle antilock braking system and further including the step of sensing speed of rotation of an associated vehicle wheel with the tone ring.

* * * * *